United States Patent
Elson et al.

[11] Patent Number: 6,017,276
[45] Date of Patent: Jan. 25, 2000

[54] LOCATION BASED ENTERTAINMENT DEVICE

[76] Inventors: Matthew Elson, 11901 Sunset Blvd., No. 207, Los Angeles, Calif. 90049; Eric A. Holmberg, 1079 Alta Pine, Altadena, Calif. 91001

[21] Appl. No.: 09/139,493

[22] Filed: Aug. 25, 1998

[51] Int. Cl.[7] ................................................. A63G 31/16
[52] U.S. Cl. ............................. 472/60; 472/59; 472/60; 472/61; 472/130; 434/29; 434/55
[58] Field of Search ................................. 472/59, 60, 61, 472/130; 434/29, 55

[56] References Cited

U.S. PATENT DOCUMENTS

| | | |
|---|---|---|
| 1,789,680 | 1/1931 | Gwinnett . |
| 3,135,057 | 6/1964 | Nelson et al. . |
| 4,251,140 | 2/1981 | Fogerty, Jr. . |
| 4,642,945 | 2/1987 | Browning et al. . |
| 4,710,128 | 12/1987 | Wachsmuth et al. . |
| 4,752,065 | 6/1988 | Trumbell et al. . |
| 4,824,099 | 4/1989 | Rusu et al. ................................. 472/3 |
| 4,995,603 | 2/1991 | Reed . |
| 5,052,932 | 10/1991 | Trani ........................................ 472/60 |
| 5,060,932 | 10/1991 | Yamaguchi ............................... 472/60 |
| 5,496,220 | 3/1996 | Engstrand ................................. 472/60 |
| 5,725,435 | 3/1998 | De Castro Faria ...................... 472/59 |

*Primary Examiner*—Kien T. Nguyen
*Attorney, Agent, or Firm*—Dorsey & Whitney LLP

[57] ABSTRACT

An entertainment device is based on a sphere that moves in coordination with visual and auditory stimuli. Audience members are seated inside the sphere in one hemisphere while an image is displayed on the inside of the opposite hemisphere. The sphere is driven by actuators to roll, pitch and yaw without limit in synchrony with the images displayed. An audio system works in synchrony with the motion to further enhance the experience. Pure horizontal or vertical motion effects may be obtained by adding one or more linear motion stages which translate the entire sphere assembly horizontally or vertically. The audience members may interact with the ride using actuators. Multiple spheres may interact with each other.

20 Claims, 8 Drawing Sheets

LOCATION BASED ENTERTAINMENT DEVICE

TECHNICAL FIELD

The field of the present invention is amusement ride and entertainment attractions. More particularly, the present invention relates to an amusement ride or entertainment device in which the viewer is moved in a spherical structure in coordination with a motion picture or audiovisual display to enhance the entertainment experience.

BACKGROUND OF THE INVENTION

Various motion devices having a moving viewer platform and a motion picture or video display have been developed for use in various amusement applications and flight simulators. See, e.g., U.S. Pat. Nos. 1,789,680; 4,642,945; and 4,752,065. For greater control over the viewer environment, some such devices have the viewer enclosed in a capsule. The motion picture or video display may or may not be within the viewer capsule. U.S. Pat. No. 4,251,140 shows a housing containing viewer seats and a film projector, as well as a spherical screen. The amusement system disclosed in U.S. Pat. No. 4,995,603 has an egg-shaped riding capsule member which is rotatable and tiltable, and which allows the passenger to view a fixed video screen placed external to the capsule.

The flight simulator disclosed in U.S. Pat. No. 3,135,057 has a spherical capsule mounted on a fluid bearing, which uses three circular race assemblies fixed to the inner surface of the wall of the sphere to effect roll, pitch and yaw movements. Power means mounted to the inner surface of the sphere contact the races to impart rotational movement directly to the races and indirectly move the sphere. The spatial disorientation trainer-flight simulator shown in U.S. Pat. No. 4,710,128 also has a capsule, which is mounted in an external gimbal framework for independent rotation about pitch, roll and yaw axes. Two amusement rides currently available (Chameleon, developed by Chameleon Technologies and R360, developed by Sega Inc.) utilize gimbaled assemblies similar to these designs to hold audience compartments.

Despite these and other prior art amusement ride and entertainment structures, there remains a need for an amusement ride device that has an effective means of imparting motion to the audience compartment and improved ability to coordinate such motion with motion picture, computer-generated or video images presented to the audience members.

SUMMARY OF THE INVENTION

The present entertainment attraction consists of a spherical capsule containing audience seats, means for displaying moving images, and a screen on which these images are displayed. The sphere is encircled by an external frame and mounted on bearing assemblies. Movement in the roll, pitch and yaw axes or any combination thereof is effected by rotary actuators that contact the external surface of the sphere. Audience seats include locking harnesses and conformal padding to prevent audience members from sustaining injury as a result of sudden positional changes. The device displays a high quality image on a screen opposite the audience members. A multichannel audio system enhances the reality of the simulation by spatially locating sounds which relate to the moving images displayed.

It is an object of this invention to provide a low cost, generic ride platform for motion simulation, utilizing one or more external drive wheels applied to the outer surface of a spherical audience capsule. Such a device has inherent advantages over existing designs, because no gimbal assembly is necessary and it can provide extreme motion to a larger number of audience members than in the typical flight simulator. Such a ride platform can provide audience members a high-intensity experience that could be non-interactive or interactive.

Other objects and features of the present invention will become apparent from the following detailed description, taken in connection with the accompanying drawings, which disclose embodiments of the invention. It is to be understood, however, that the drawings are intended for the purpose of illustration only and are not intended as a definition of the limits of the invention.

BRIEF DESCRIPTION OF THE DRAWINGS

In the drawings, wherein similar reference characters denote similar elements through several views.

DETAILED DESCRIPTION OF THE PREFERRED EMBODIMENT

Figure 1A:
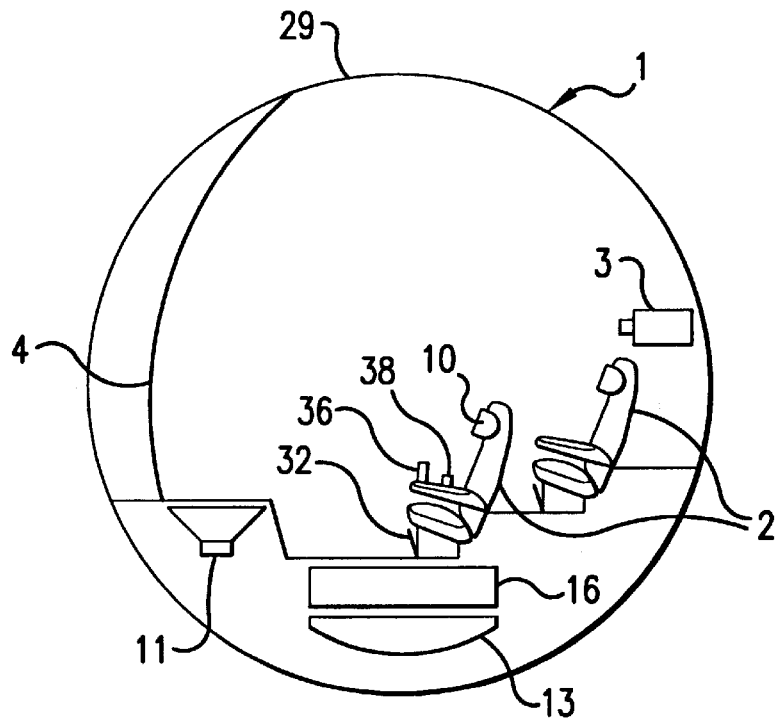
FIGS. 1a, 1b, 1c, respectively, are side, top and front views of a preferred embodiment of the spherical capsule of the present invention as disclosed herein. In each, a portion of the capsule is removed to show the interior.

Referring to the detail in the drawings, the present amusement ride device 50 consists of an opaque, substantially spherical capsule 1 approximately fifteen feet in diameter, containing approximately seven audience seats 2 in two tiers, a projector 3 for displaying moving images, and a curved screen 4 which, in coordination with sound reproduction devices, serves as the audiovisual display. (Alternatively, screen 4 could be an electronic display driven like a computer screen, without a projector.) The capsule 1 could be larger or smaller so as to accommodate different numbers of audience members.

Figure 2A:
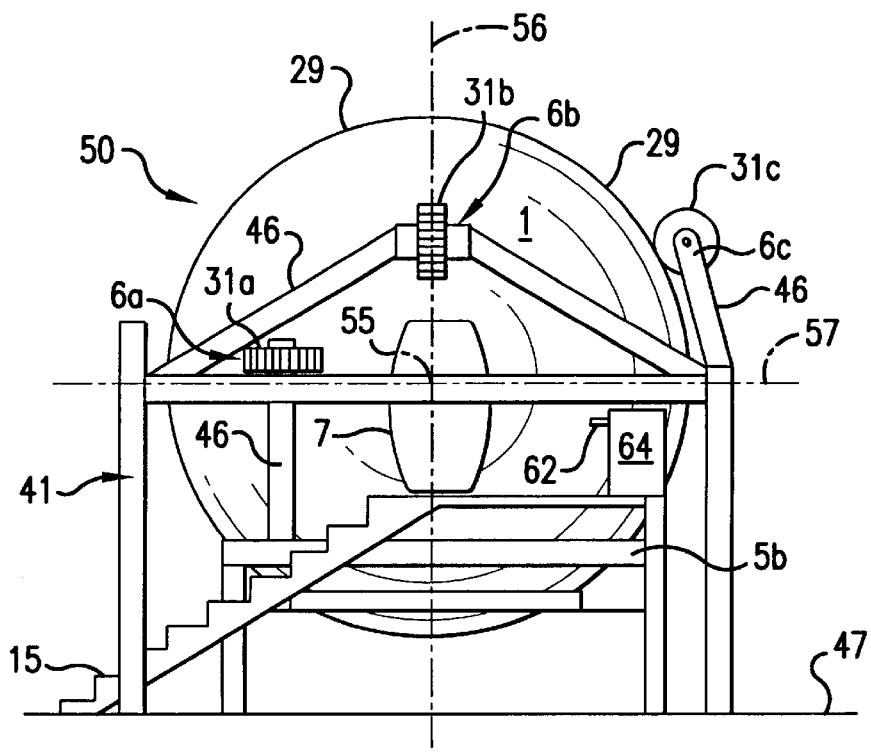
FIGS. 2a and 2b, respectively, are side and top views of the invention showing the external support frame, drive actuators and audience ingress/egress.
Figure 2B:
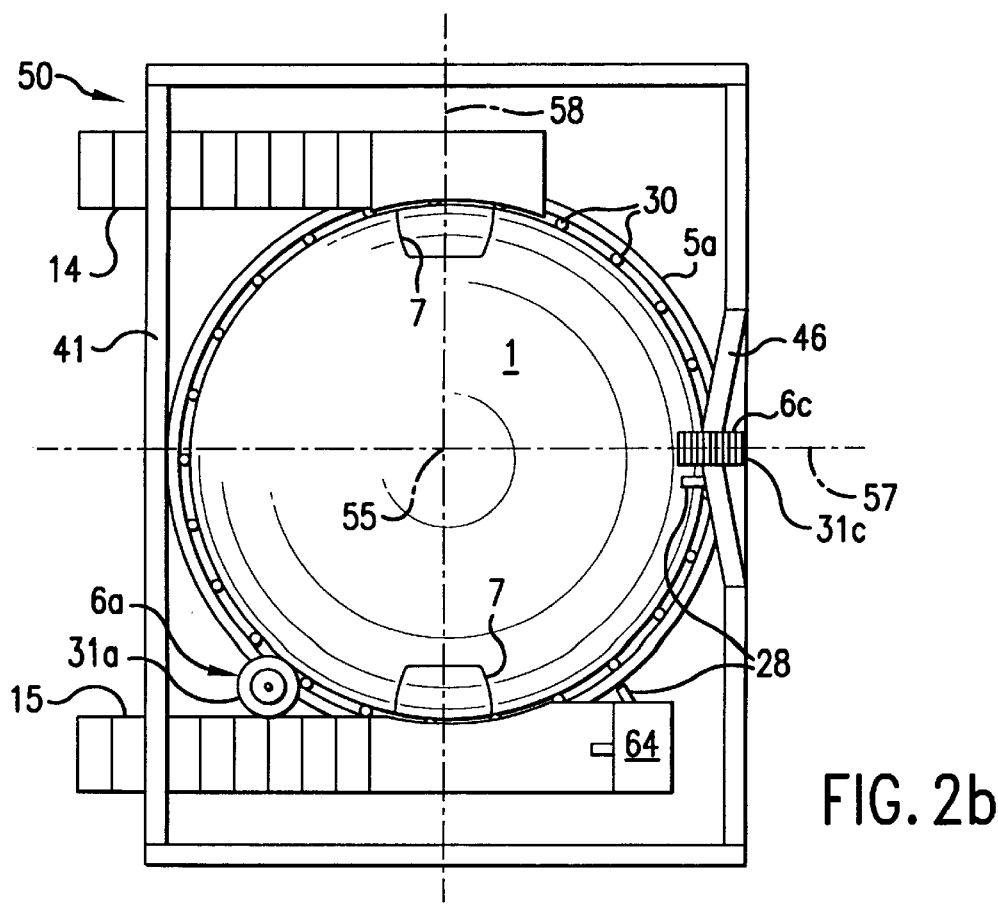

As best seen in FIGS. 2a and 2b, the capsule 1 is supported and held in place by upper and lower circular bearing assemblies 5a, 5b, respectively, extending inward from a rectangular external frame 41. Lower bearing assembly 5b forms a full circle on which the capsule 1 rests, while upper bearing assembly 5a (located approximately at the equator of the capsule 1) is formed as circle segments interrupted to allow audience ingress and egress. Each bearing assembly 5a, 5b contains ball bearings 30 or other anti-friction means in contact with the outer surface 29 of the capsule 1. Thus, the external flame 41 and bearing assemblies 5a, 5b permit the capsule 1 to rotate about any number of axes passing through a fixed center 55 of the spherical capsule 1. As has been recognized in the prior art, a viewer's entertainment experience when viewing a projected image can be enhanced by causing the viewer to move and/or accelerate and decelerate in coordination with the projected images. In the present invention the images on screen 4 can be synchronized with various appropriate motions of the capsule 1 that will be sensed as pressure imparted by each seat 2 to its occupant. Acceleration is an important factor, because an audience member within capsule 1 will have only gravity but no outside visual reference to establish motion relative to a fixed point on the earth 47.

Movement of the capsule 1 in yaw, roll and pitch senses is driven by independent rotary capsule actuators 6a, 6b, 6c, which are powered by hydraulic, electric or other means. Each rotary capsule actuator 6a, 6b, 6c is mounted to the external frame 41 directly or by suitable mounting arms 46. The rotary capsule actuators 6a, 6b, 6c contact the outer surface 29 of the capsule 1 using bidirectional drive wheels 31a, 31b, 31c, respectively. When rotated, each wheel 31a, 31b, 31c applies force to the capsule 1 in one of three directions (each direction being defined by a tangent in the plane of rotation of each wheel that passes through the point of contact between the wheel 31a, 31b, 31c and the sphere 1), while allowing slip to occur in the transverse direction. In this way simultaneous pitch, roll and yaw motion and acceleration may be affected. To simplify the sequencing of motion, the wheels 31a, 31b, 31c are positioned to provide rotation about: a first axis 56 that passes through the fixed center 55 and is substantially perpendicular to the earth 47; a second axis 57 that passes through the fixed center 55 and is substantially parallel to the earth 47 and orthogonal to the first axis 57; and a third axis 58 that passes through the fixed center 55 and is substantially perpendicular to the earth 47 and orthogonal to both the first axis 57 and the second axis 58. Stated differently, each wheel 31a, 31b, 31c is positioned to rotate the spherical capsule 1 about an axis, and each such rotational axis is orthogonal to the other two axes.

The driving capacity of rotary actuators 6a, 6b, 6c will depend on the kind of motion that needs to be imparted. If only gentle acceleration is desired (for example, to simulate glider or balloon flight), then less powerful actuators 6a, 6b, 6c are needed. If sharper motion sensations are desired (for example, to simulate a roller coaster ride or stunt flying), then the actuators 6a, 6b, 6c will need to be more powerful. They can also be mounted in opposed, coacting pairs so as to have greater driving contact with capsule 1.

It will be seen that an important advantage of the present invention over many prior art structures is that longer periods of accelerating motion can be sustained. Unlike prior art structures that are actuated by rams or levers, which have limited extension, the drive wheels 31a, 31b, 31c can accelerate without being subject to any linear element length, but rather subject only to maximum rotational speed. More important, there is no necessary recovery time for retraction of any actuators. Thus, one sharp, extended accelerating motion in a given direction can be followed essentially immediately by another. While prior art gimbal-mounted structures can impart similar rotational motion, it is believed that they have a less efficient driving mechanism, and the only available rotational axes at any given moment are those defined by the instantaneous position of the gimbal mounts. Accordingly, it is believed that the present invention can improve the motion effects available relative to gimbal mounted structures and make control of these motion effects easier to understand for those who design the coordination of visual display, sound and motion.

Referring now to FIGS. 2a and 2b, audience members embark through ingress stairway 14 and disembark through egress stairway 15. Entry to and exit from the capsule 1 occurs through doors 7 built to close flush at the outer surface 29 of the capsule 1. Once inside, the audience members are seated into padded seats 2, which contain conformal padding and full body harnesses 9 (FIG. 1c), so the audience is not injured by sudden positional changes and remains in the seat 2 even if the capsule 1 inverts completely. A small compartment 32 below each seat 2 allows the audience member's purse, pocket change, keys and other such loose articles to be safely stored during the ride. Speakers or other sound reproduction devices 10 (FIG. 1c) contained in the head area of each seat 2 provide stereo, high fidelity audio to audience members to spatially locate sounds associated with the audio visual display. If desired, the sound reproduction devices can also include a separate sub-woofer 11 that provides low frequency audio for the entire capsule.

Figure 1B:
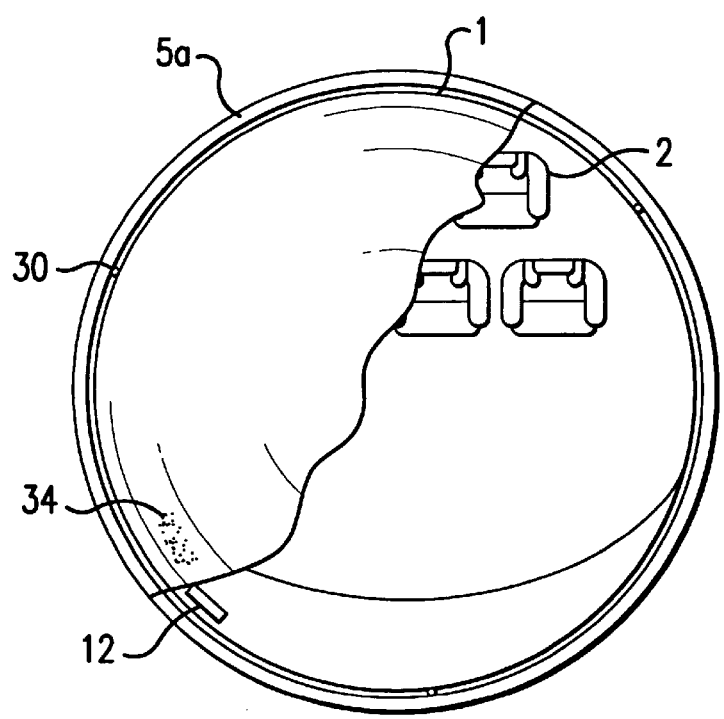
Figure 1C:
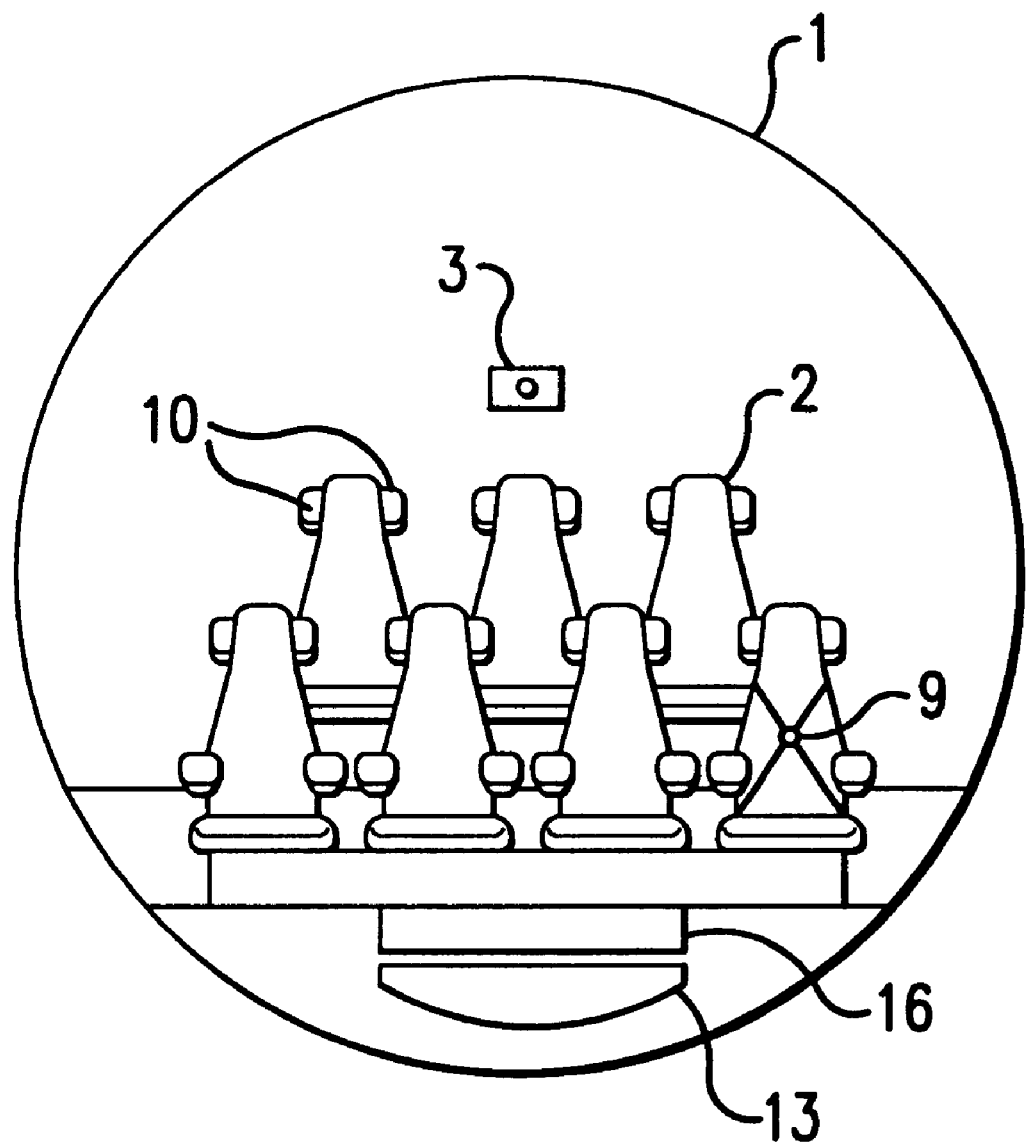

As best seen in FIG. 1b, ventilation of the capsule 1 is provided by drawing air into the capsule 1 through one or more fans 12 mounted on the inside of the surface 29 of the capsule 1. This air enters the capsule 1 through small holes 34 in the surface 29 of the capsule 1 adjacent where the fans 12 are located. These holes 34 are preferably baffled to prevent ambient light from entering the inside of the capsule 31. (Similar air exit holes (not shown) can be located elsewhere on the surface.) If the temperature and speed of air drawn in by fans 12 is regulated, it can be used to suggest climatological conditions associated with the projected images (e.g., chilled air for a winter scene).

In one embodiment of the invention, all motion and audiovisual display is preprogrammed and determined by information stored in time synchronization with the images displayed. The motion signals can either be determined by the judgment of the person that assembles the sound track and the video displayed on screen 4, or, in accordance with the suggestion of U.S. Pat. No. 4,752,065, images can be recorded with a camera recording system mounted on a moving vehicle with accelerometers or other motion detection apparatus to sense and record acceleration actually experienced by the vehicle (and thus the camera) as it records video images. In another embodiment, the motion and audiovisual display would not be completely preprogrammed, but rather would be at least partly influenced by audience member sensor input, interactively received. Interactive input from an audience member could be manual input sensed from joy-sticks, pedals, and/or buttons placed at each seat. FIG. 1a shows a joy stick 36 mounted on a seat arm. The audience input can be used to affect either the motion component of the entertainment or the audiovisual display component or both. Alternatively, audience member input could be obtained by sensor input representing blood pressure, galvanic skin response, brain waves or other physiological reaction. An emergency safety stop button 38 is also placed on the arm of each seat 2 to automatically right and stop the capsule 1 if an audience member became unduly disoriented.

In still another embodiment, an operator or outside participant (e.g., another audience person located elsewhere) receives communicated information on the position of the capsule and audience member reaction or interactive input from audience members and could use ajoy-stick 62 or other operator control input interface 92 or an outside participant control interface 94 at a control console 64 to select or guide motion or affect the audiovisual display of the capsule 1 in response to that information. The position information could be presented to the operator or outside participant in a scale model or three dimensional representation of the capsule (not shown), while the audience member information could be presented by television (including audio) observation of audience members.

Figure 6:
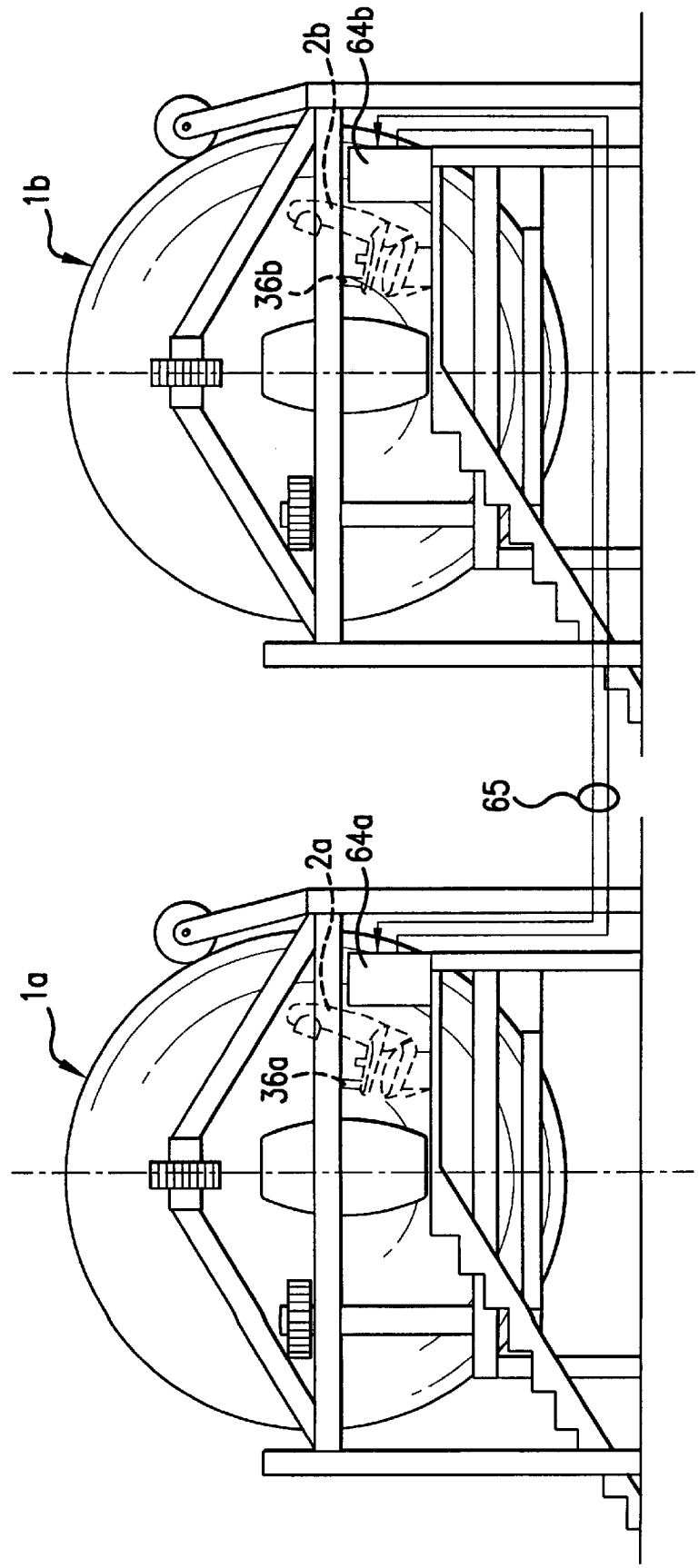
FIG. 6 shows in schematic form how two capsules can be linked so that each can interactively affect the motion of the other.

In a still further embodiment, shown in FIG. 6, two capsules 1a and 1b are linked so that each can interactively affect the motion or audiovisual display of the other. Thus, each capsule 1a, 1b receives outside participant control input from the other that affects either the motion component of the entertainment or the audiovisual display component or both. This interaction occurs by at least one seat 2a, 2b (shown in phantom lines) of each capsule 1a, 1b having a joy stick or other control 36a, 36b that allows control of motion and/or control of a simulated weapon, such as a laser gun. Each capsule 1a, 1b is provided a display of the position of the other and its use of its ""weapon."' The information flows on an interaction network 65 that connects the two capsules 1a, 1b. The format of interaction is much like a video game, except that each player (or group of players acting as a team) is contained within its own capsule and subject to motion and changes in the audiovisual display that follow from the game activity. If desired, different players on a single team can have different functions (e.g., speed, front-mounted weapon, rear-mounted weapon) implemented in the joy stick or other control 36a, 36b that is present at his/her seat. In this manner, all within a single capsule 1a or 1b can actively participate in different aspects of its interaction with the other. Obviously, to the extent one capsule 1a or 1b is able to influence the motion of the other, the game control system must limit the influence to what can be tolerated by the audience members of the other capsule.

The capsule 1 must be easily righted in the case of a power outage or equipment malfunction. This is accomplished by designing the drive system so that the drive wheels 31a, 31b, 31c idle when unpowered. Ballast 13 in the base of capsule 1 would then cause the capsule 1 to right itself. The capsule 1 can then be rotated by use of the yaw axis drive motor 6a or moved manually by the ride attendant until the doors 7 can be opened.

In the preferred embodiment of the device 50, there are no fixed wire connections between the capsule 1 and the outside. Thus, it becomes necessary for the capsule 1 to have some power supply means and to have arrangements for receiving any necessary control signals from the outside.

Figure 3:
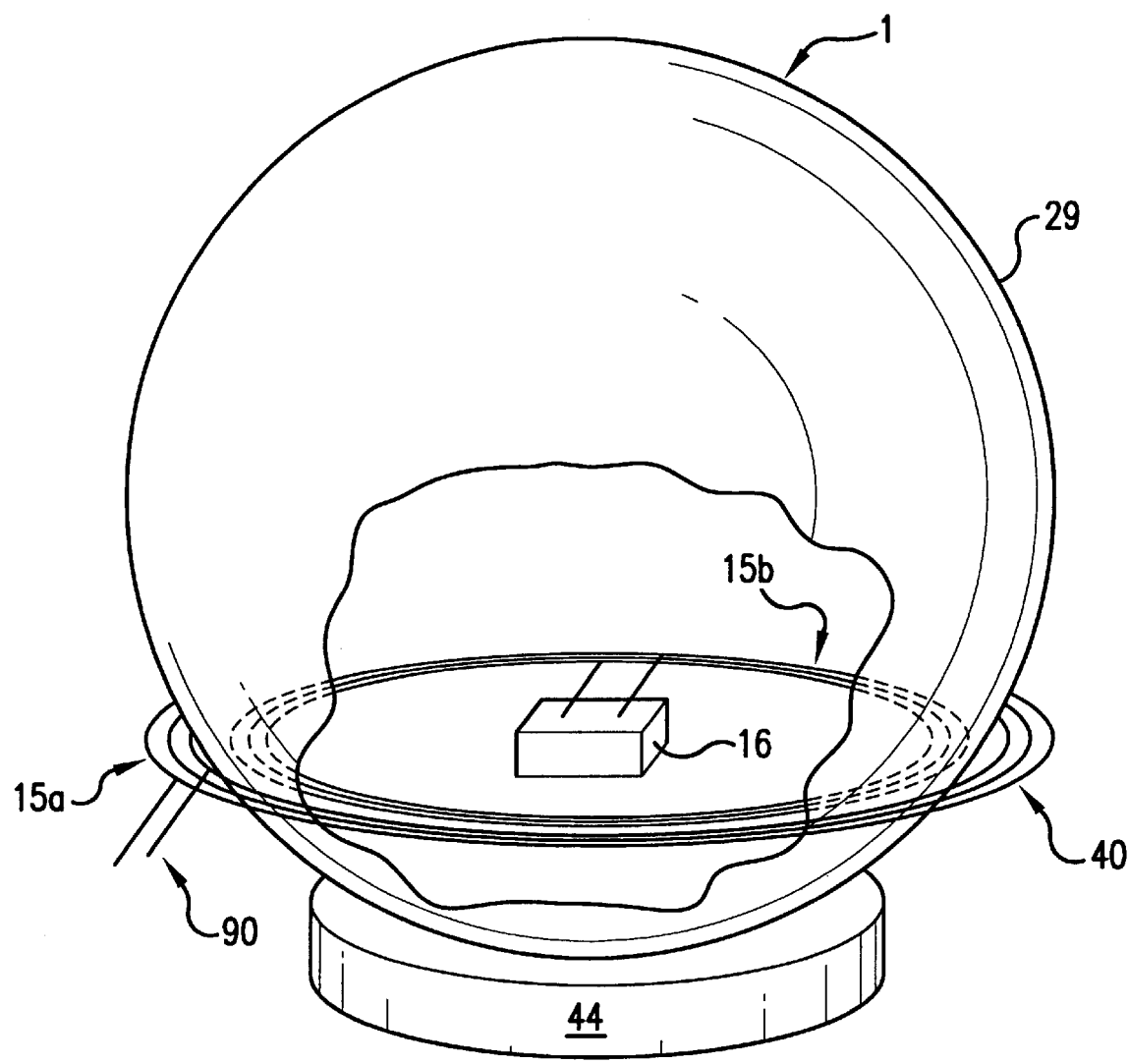
FIG. 3 is a pictorial view that illustrates schematically a preferred embodiment to supply power to the electrical system of the capsule in the present invention.

FIG. 3 illustrates a preferred embodiment for the coupling system for supplying power to the electrical system inside the capsule 1. A magneto-inductive coupler 40 supplies electrical power through the surface 29 of the capsule 1 (which for these purposes would be made from plastic or other non-conductive material) when the orientation of capsule 1 is nearly vertical. The coupler 40 consists of a fixed inductor 15a with power input leads 90 located outside and underneath the equator of capsule 1 and a corresponding spun inductor 15b inside the capsule. It is not likely that the orientation of the capsule 1 will be far from vertical for extended periods of time, because the audience members would become uncomfortable. This allows the power coupler 40 to deliver power efficiently during most of the ride. Rechargeable batteries 16 located in the capsule 1 provide power when the capsule 1 is not vertical enough to utilize the power coupler 40. These batteries 16 would be recharged when depleted through the power coupler 40. The batteries 16 would also provide some of the ballast 13 mentioned previously. An electrical commutator (not shown) could be used instead of the inductive coupler 40.

FIG. 3 also shows an alternative support structure for the capsule 1. In this embodiment the external frame 41 has no lower bearing assembly 5b that bears the weight of the capsule 1. Rather, capsule 1 rests on an air bearing or fluid antifriction means 44 that provides support and permits rotational motion of the capsule 1 in any direction.

Figure 4:
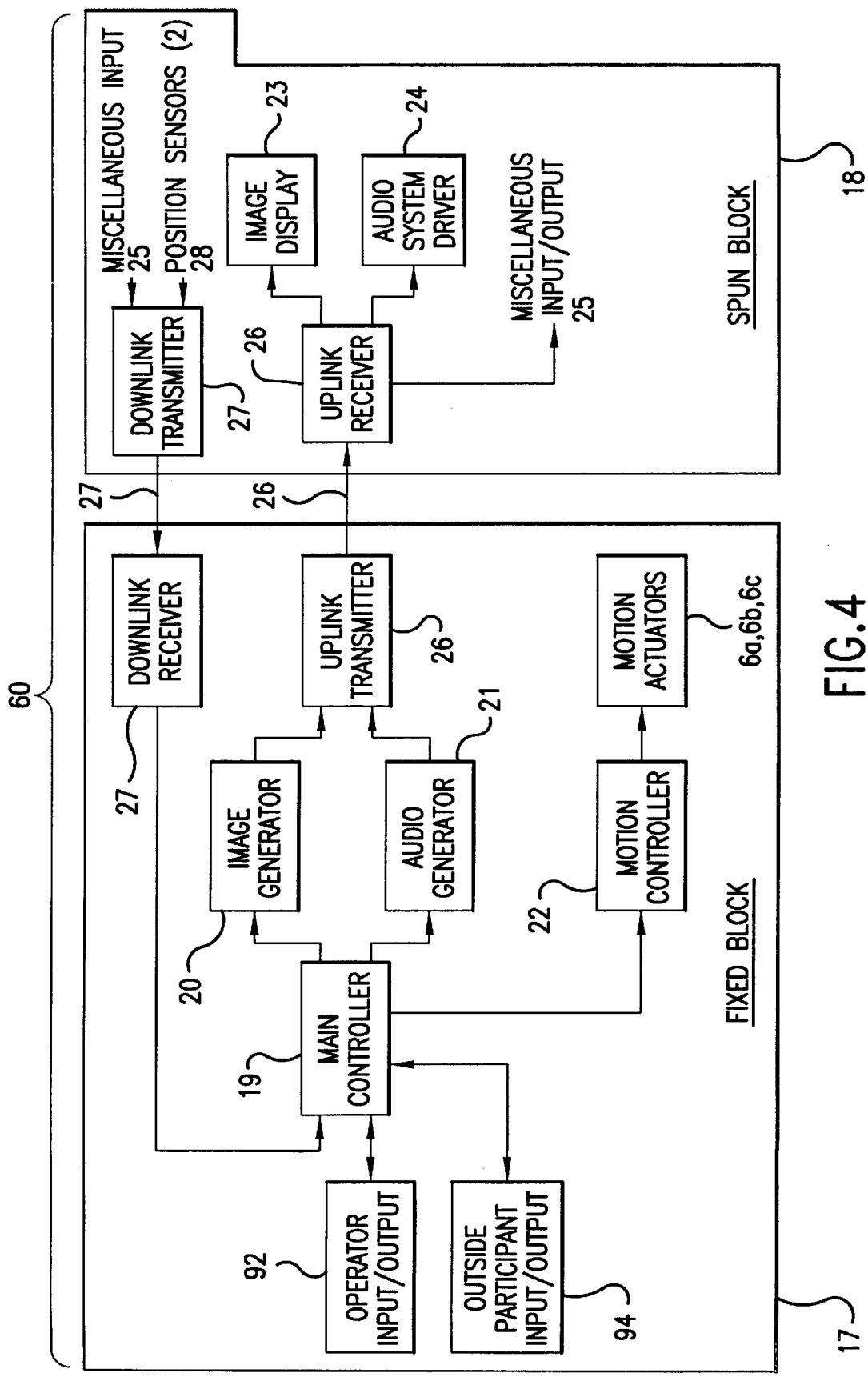
FIG. 4 shows in block diagram form a control system for the present invention.

FIG. 4 illustrates a block diagram of the control system 60 for the device 50. The control system 60 consists of two main sub-assemblies—a fixed block 17 external to the capsule 1 (preferably contained in control console 64 adjacent the capsule 1), and a spun block 18 internal to the capsule 1. Communication between the fixed and spun blocks 17, 18 is done using uplink 26 and downlink 27 electromagnetic (or other communication) interfaces (each with transmitter and receiver), which require that the capsule 1 be essentially transparent at the radio or other frequencies used for communication. This can be accomplished by constructing the body of the spherical capsule 1 from high-impact plastic, with a metal frame for rigidity.

The external block 17 consists of a main controller 19 which sequences ride operation and sends commands to the image generator 20 to drive the image displayed at screen 4, audio generator 21 to drive sound reproduction devices 10 and motion controller 22 that send commands to actuators 6a, 6b, 6c. The main controller 19 has input-output facilities to communicate with an operator or an outside participant at interfaces 92, 94, respectively. The spun block 18 consists of an image display driver 23 linked to projector 3 (or, alternatively, electronic screen display 4), multichannel audio system driver 24, and miscellaneous input/output device controllers 25 for monitoring the status of seat harnesses 9, signals from emergency stop buttons 38, and user input from joy-sticks 36, and for selectively powering lights, fans, etc. The implementation of each of these sub-assemblies would preferably be primarily in programmable integrated circuits provided in a variety of forms known to a person skilled in the art of electronic control systems.

A pair of optical position sensors 28 attached to the external frame 41 and attuned to characteristic locational markings (not shown) on the surface 29 of capsule 1 provide the control system 60 with absolute sphere position information to prevent mechanical slip from causing position error during operation. In an alternative embodiment, position sensing could be effected with magnetic, acoustic or other sensing techniques.

Figure 5:
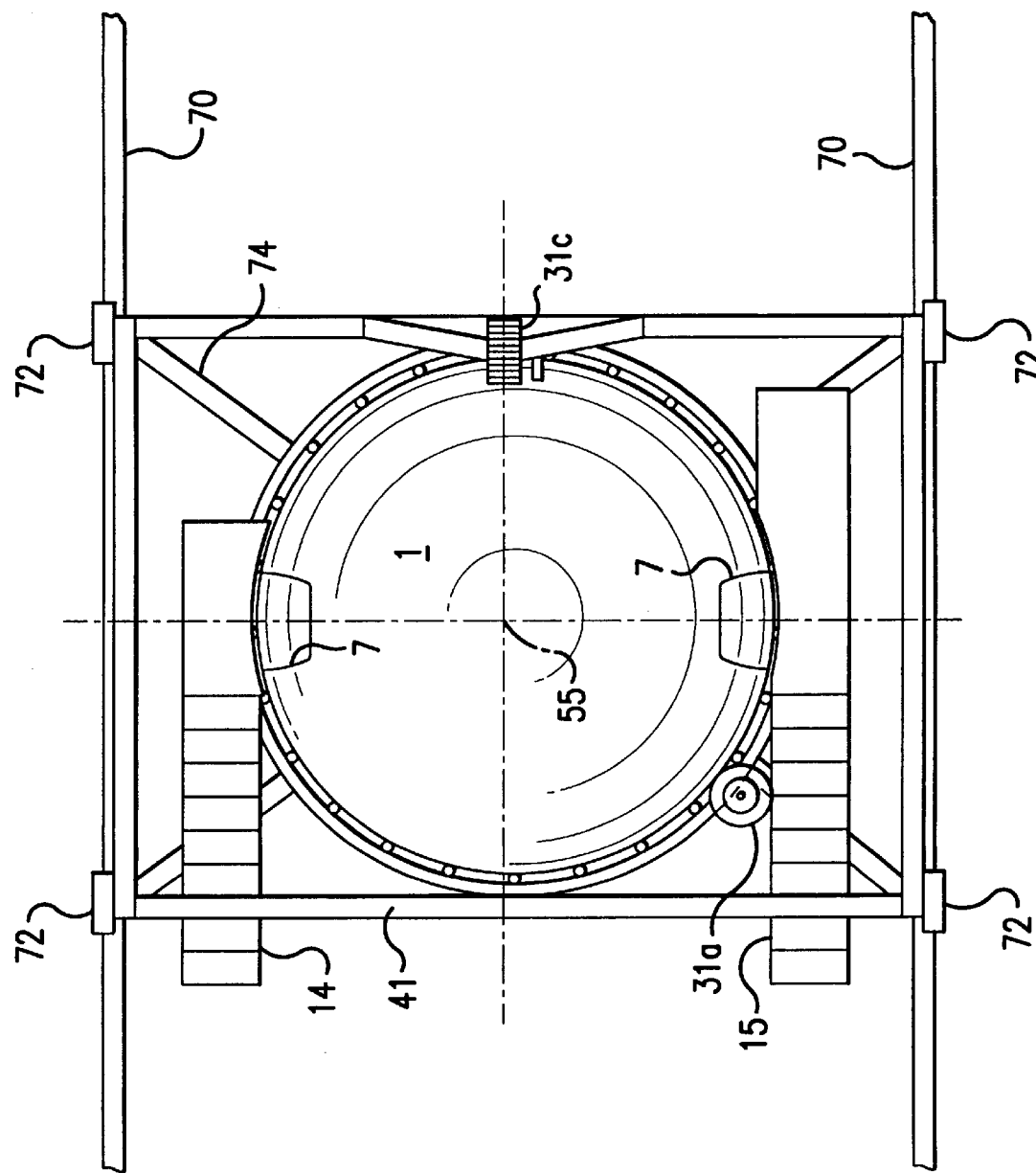
FIG. 5 shows a plan view of the present invention enhanced by means for applying linear motion to the capsule.

FIG. 5 shows an alternate embodiment of the invention wherein, the external frame 41 is not fixed to the earth 47 but rather mounted on a displacement platform 74 with linear actuator wheels 72 on tracks 70. This arrangement permits translational motion in either direction along tracks 70. This can be perceived as either sideways or front-to-back motion by the audience members depending on the orientation of the screen 4 relative to the tracks 72. Thus, in this embodiment, an additional element of linear acceleration can be added to the entertainment experience.

If the entertainment programs to be presented require less extreme ranges of motion and/or it is desired to accommodate larger audience groups, the spherical capsule 1 could be replaced by a partial sphere. This would be essentially the same as described above but with a portion of the sphere above the seats 2 removed. Such a partial sphere could still be rotated and tipped in a variety of ways and could accommodate larger audiences within a less massive structure than a full sphere with the same number of seats. The driving and control systems would be much the same as described above, but motion would be limited by the control system 60 to positions in which actuators 6a, 6b and 6c would maintain adequate contact with the surface of the partial sphere. With this device, an audience could observe either the surrounding natural environment (e.g., a starry sky) or could be presented with lighting effects or other artificial elements displayed above the open portion as a complement to the audiovisual program within the spherical capsule.

Figure 7:
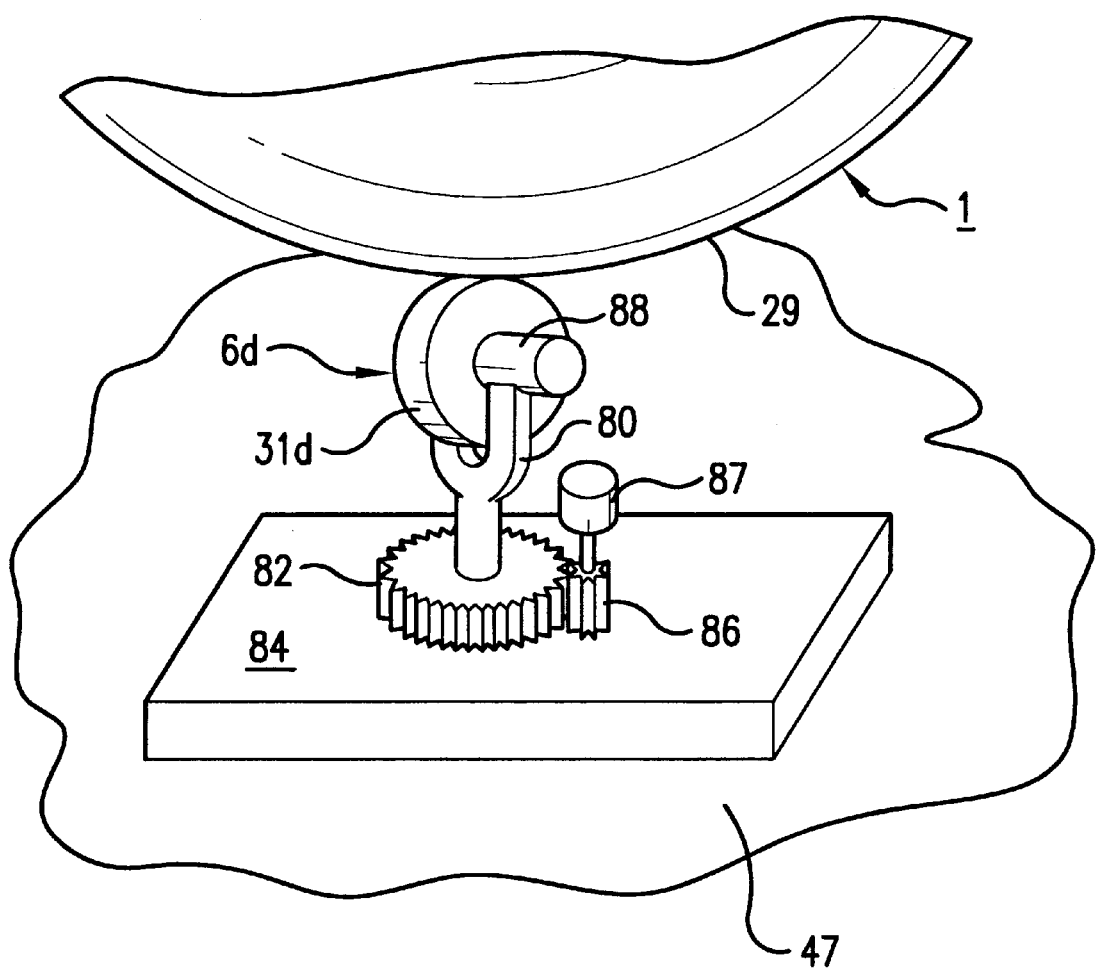
FIG. 7 shows a pictorial view of an alternative drive mechanism for the present invention.

A somewhat simplified and less expensive alternative form of actuator for the spherical capsule 1 is shown in FIG. 7. As seen in FIG. 7, a single actuator 6d with a single, swiveling drive wheel 31d is positioned in contact with (preferably) the bottommost portion of the spherical capsule 1. Here, the drive wheel 31d is held in a Y-bracket 80 mounted on a swivel gear mounting base, comprising a swivel gear 82, which in turn is rotatably mounted on a swivel base 84 that is parallel to earth 47 (horizontal). Drive wheel 31d differs from those discussed above, because it permits no side-slip. Pinion gear 86 driven by power unit 87 engages swivel gear 82 and permits rotational axis of drive wheel 31d to be moved 360 degrees in either direction in a horizontal plane and positioned at any angle. Drive motor 88 mounted on one arm of Y-bracket 80 causes drive wheel 31d to rotate about its axis to cause motion of the spherical capsule 1. That is, the rotatable capsule drive wheel 31d is in contact with the outer surface of the capsule 1 for imparting motion to the capsule 1 and supplying motion to rotate the capsule about a first axis that passes through the fixed center 55 of the capsule 1 and is parallel to the axis of rotation of the rotatable capsule drive wheel 31d. The swivel gear mounting base for the capsule drive wheel 31d moves about a second axis substantially perpendicular to earth 47, the first and second axes in this embodiment being orthogonal to each other.

By sequentially positioning Y-bracket 80 at one or more desired angles relative to swivel base 84, and driving drive wheel 31d forward or backward, a full range of motion of the spherical capsule 1 about a variety of axes can be achieved. The coordination of motion delivered by drive wheel 31d would be somewhat different than that by the system shown in FIGS. 1–4 (instead of control based on actuators operating to cause rotation on orthogonal x, y and z axes, control would be analyzed in terms of rotational coordinates), but essentially all of the same structural and control features as shown in FIGS. 1–4 (with the exception of actuators 6a, 6b, 6c and their supporting structure) would be used with the drive system of FIG. 7.

Although the description of the preferred embodiments has been presented, it is contemplated that various changes could be made without deviating from the spirit of the present invention. Accordingly, it is intended that the scope of the present invention be dictated by the appended claims rather than by the description of the preferred embodiments.

What is claimed is:

1. An entertainment device comprising:
   a substantially spherical capsule mounted for motion about a fixed center but not a fixed axis;
   one or more audience member seats mounted within the capsule;
   an audiovisual display with coordinated sound reproduction devices within the capsule;
   first and second rotatable capsule actuators in rotating, driving contact with the outer surface of the capsule for imparting motion to the capsule, each capsule actuator supplying motion to rotate the capsule about an axis passing through the fixed center, and the axes of said first and second capsule actuators being substantially orthogonal to each other; and
   a control system that drives the audiovisual display and sound reproduction devices and sequences rotation of the capsule actuators in coordination with the audiovisual display and sound reproduction devices.

2. The device of claim 1, wherein the first and second capsule actuators cause rotation about a first axis substantially perpendicular to earth and a second axis substantially horizontal to earth, respectively.

3. The device of claim 2, further comprising a third capsule actuator that causes rotation about a third axis, said third axis also being substantially horizontal to earth and substantially orthogonal to both the axes about which the first and second capsule actuators cause rotation.

4. The device of claim 3 wherein the control system can cause any simultaneous combination of roll, pitch and yaw motion by the capsule.

5. The device of claim 4 wherein actuators comprise bi-directional drive wheels used to rotate the sphere in roll, pitch or yaw directions simultaneously.

6. The device of claim 1 further comprising an audience member control input, wherein at least one audience member may influence the motion or audiovisual display components of an entertainment experience through audience member sensor input.

7. The device of claim 6 wherein the audience member sensor input is manual input.

8. The device of claim 1 further comprising an operator control input, wherein the operator may influence the motion or audiovisual display components of an entertainment experience through an operator input interface.

9. The device of claim 1 further comprising an outside participant control input, wherein an outside participant may influence the motion or audiovisual display components of an entertainment experience through an outside participant input interface.

10. The device of claim 9 wherein the outside participant is in another capsule of the same kind as the capsule that is influenced.

11. The device of claim 1 wherein the spherical capsule has an internal electrical system and electrical power is supplied to the internal electrical system of the capsule using magneto-inductive coupling or electrical commutation.

12. The device of claim 1 wherein the control system comprises a fixed control subassembly outside the capsule and a spun control subassembly inside the capsule and control information is transmitted between the fixed control subassembly and the spun control subassembly using communication links.

13. The device of claim 1 further comprising a displacement platform on which the amusement device is mounted for linear displacement of the capsule in at least one dimension.

14. An entertainment device comprising:
   a spherical capsule with a portion of the sphere removed, said capsule mounted for motion about a fixed center but not a fixed axis;
   one or more audience member seats mounted within the capsule, the removed portion of the sphere being above the audience member seats;
   an audiovisual display with coordinated sound reproduction devices within the capsule;
   first and second rotatable capsule actuators in rotating, driving contact with the outer surface of the capsule for imparting motion to the capsule, each capsule actuator supplying motion to rotate the capsule about an axis passing through the fixed center, and the axes of said first and second capsule actuators being substantially orthogonal to each other; and a control system that drives the audiovisual display and sound reproduction devices and sequences rotation of the capsule actuators in coordination with the audiovisual display and sound reproduction devices.

15. An entertainment device comprising:

a substantially spherical capsule mounted for motion about a fixed center but not a fixed axis;

one or more audience member seats mounted within the capsule;

an audiovisual display with coordinated sound reproduction devices within the capsule;

a rotatable capsule drive wheel in rotating, driving contact with the outer surface of the capsule for imparting motion to the capsule and supplying motion to rotate the capsule about a first axis passing through the fixed center and parallel to the axis of rotation of the rotatable capsule drive wheel;

a swivel gear mounting base for the capsule drive wheel, said swivel gear mounting base rotating about a second axis, the first and second axes being substantially orthogonal to each other; and a control system that drives the audiovisual display and sound reproduction devices and sequences rotation of the capsule drive wheel and swivel gear in coordination with the audiovisual display and sound reproduction devices.

16. The device of claim 15 further comprising an audience member control input, wherein at least one audience member may influence the motion or audiovisual display components of an entertainment experience through audience member sensor input.

17. The device of claim 16 wherein the audience member sensor input is manual input.

18. The device of claim 15 further comprising an operator control input, wherein the operator may influence the motion or audiovisual display components of an entertainment experience through an operator input interface.

19. The device of claim 15 further comprising an outside participant control input, wherein an outside participant may influence the motion or audiovisual display components of an entertainment experience through an outside participant input interface.

20. The device of claim 19 wherein the outside participant is in another capsule of the same kind as the capsule that is influenced.

* * * * *